US012749002B2

(12) United States Patent
Kendall

(10) Patent No.: US 12,749,002 B2
(45) Date of Patent: Sep. 29, 2026

(54) ANALOG SYSTEM USING EQUILIBRIUM PROPAGATION FOR LEARNING

(71) Applicant: OpenAI Opco, LLC, San Francisco, CA (US)

(72) Inventor: Jack David Kendall, San Mateo, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 1137 days.

(21) Appl. No.: 16/892,037

(22) Filed: Jun. 3, 2020

(65) Prior Publication Data

US 2021/0049504 A1 Feb. 18, 2021

Related U.S. Application Data

(60) Provisional application No. 62/886,800, filed on Aug. 14, 2019.

(51) Int. Cl.

| | |
|---|---|
| ***G06N 20/00*** | (2019.01) |
| ***G06N 3/048*** | (2023.01) |
| ***G06N 3/065*** | (2023.01) |
| ***G06N 3/084*** | (2023.01) |

(52) U.S. Cl.

CPC ............. *G06N 20/00* (2019.01); *G06N 3/048* (2023.01); *G06N 3/065* (2023.01); *G06N 3/084* (2013.01)

(58) Field of Classification Search

CPC ........ G06N 20/00; G06N 3/048; G06N 3/065; G06N 3/084

See application file for complete search history.

(56) References Cited

U.S. PATENT DOCUMENTS

| | | | | | |
|---|---|---|---|---|---|
| 4,045,658 | A * | 8/1977 | Peltola | G01K 7/14 | 374/E7.015 |
| 4,703,284 | A * | 10/1987 | Barbu | H03F 3/195 | 330/261 |
| 4,763,106 | A * | 8/1988 | Gulczynski | H03M 1/361 | 341/159 |

(Continued)

FOREIGN PATENT DOCUMENTS

| | | |
|---|---|---|
| CN | 107690663 | 2/2018 |
| WO | 2009113993 | 9/2009 |
| WO | 2021030063 | 2/2021 |

OTHER PUBLICATIONS

Benjamin Scellier, Implementing Equilibrium Prop on Analog Circuits, Jun. 27, 2019.

Kendall et al., Training End-to-End Analog Neural Networks with Equilibrium Propagation, Jun. 9, 2020, pp. 1-31.

(Continued)

*Primary Examiner* — Omar F Fernandez Rivas

*Assistant Examiner* — Tri T Nguyen

(74) *Attorney, Agent, or Firm* — Finnegan, Henderson, Farabow, Garrett & Dunner, LLP

(57) ABSTRACT

A system for performing learning is described. The system includes a linear programmable network layer and a nonlinear activation layer. The linear programmable network layer includes inputs, outputs and linear programmable network components interconnected between the inputs and the outputs. The nonlinear activation layer is coupled with the outputs. The linear programmable network layer and the nonlinear activation layer are configured to have a stationary state at a minimum of a content of the system.

20 Claims, 7 Drawing Sheets

(56) References Cited

U.S. PATENT DOCUMENTS

| | | | | |
|---|---|---|---|---|
| 5,841,308 | A * | 11/1998 | Nagata | H03F 3/45475 327/317 |
| 8,675,391 | B2 | 3/2014 | Snider | |
| 10,127,494 | B1 | 11/2018 | Cantin | |
| 10,198,691 | B2 | 2/2019 | Nino | |
| 10,290,801 | B2 * | 5/2019 | Narayanan | H10N 70/8416 |
| 10,332,004 | B2 | 6/2019 | Kataeva | |
| 10,515,312 | B1 * | 12/2019 | Kubo | G06N 3/04 |
| 10,643,694 | B1 * | 5/2020 | Alessandri | G11C 11/223 |
| 11,138,500 | B1 * | 10/2021 | Mountain | G11C 13/0026 |
| 11,468,145 | B1 * | 10/2022 | Duong | G06N 3/048 |
| 2004/0155643 | A1 * | 8/2004 | Hidaka | G01D 3/032 324/101 |
| 2007/0043452 | A1 * | 2/2007 | Buscema | G06N 3/048 706/2 |
| 2011/0096589 | A1 | 4/2011 | Bratkovski | |
| 2013/0082781 | A1 * | 4/2013 | Van Buren | H03G 3/20 330/279 |
| 2015/0357566 | A1 * | 12/2015 | Wang | H10N 70/841 257/4 |
| 2016/0379110 | A1 * | 12/2016 | Eleftheriou | G06N 3/065 706/33 |
| 2017/0098156 | A1 | 4/2017 | Nino | |
| 2018/0165573 | A1 | 6/2018 | Hsu | |
| 2018/0309451 | A1 | 10/2018 | Lu | |
| 2018/0336470 | A1 | 11/2018 | Kendall | |
| 2018/0367022 | A1 * | 12/2018 | Gopalraju | H02M 1/08 |
| 2019/0005402 | A1 * | 1/2019 | Mohseni | G06N 20/00 |
| 2019/0332927 | A1 * | 10/2019 | Otsuka | H03M 1/462 |
| 2020/0035305 | A1 * | 1/2020 | Choi | G11C 11/54 |
| 2020/0059610 | A1 * | 2/2020 | Maegawa | H04N 25/709 |
| 2020/0090045 | A1 * | 3/2020 | Baker | G06N 3/084 |
| 2020/0272893 | A1 | 8/2020 | Danial | |
| 2020/0364577 | A1 * | 11/2020 | Le Gallo-Bourdeau | G06N 3/084 |
| 2021/0125070 | A1 * | 4/2021 | Wang | G06N 3/063 |
| 2021/0201136 | A1 * | 7/2021 | Chalamalasetti | G06N 3/08 |
| 2022/0036199 | A1 | 2/2022 | Prasanna | |

OTHER PUBLICATIONS

Pantone et al., Memristive Nanowires Exhibit Small-World Connectivity, Neural Networks 106 (2018) 144-151, available online Jul. 17, 2018.

Soudry et al., Memristor-Based Multilayer Neural Networks with Online Gradient Descent Training, IEEE Transaction on Neural Networks and Learning Systems, vol. 26, No. 10, Oct. 2015, pp. 2408-2421.

Will Johnson, Nonlinear Electrical Networks, Aug. 16, 2010.

William Millar, The London Edinburgh, and Dublin Philosophical Magazine and Journal of Science: Series 7, CXVI. Some General Theorems for Non-Linear Systems Possessing Resistance, 1951.

Suri et al., Bio-Inspired Stochastic Computing Using Binary CBRAM Synapses, IEEE Transactions on Electron Devices, vol. 60, No. 7, Jul. 2013, pp. 2402-2409.

Hollis et al. A neural network learning algorithm tailored for VLSI implementation. IEEE transactions on neural networks. Sep. 1994;5(5):784-91. (Year: 1994).

Liao et al. Self-sustained oscillation in a memristor circuit. Nonlinear Dynamics. Apr. 2019,96(2): 1267-81. (Year: 2019).

Allison et al., A Variational Approach to the Analysis of Dissipative Electromechanical Systems, PLOS One, Feb. 2014, vol. 9, Issue 2, pp. 1-12.

Fred Riewe, Nonconservative Lagrangian and Hamiltonian Mechanics, Physical Review E, vol. 53, No. 2, Feb. 1996, pp. 1890-1899.

J. Tenreiro Machado, Fractional Generalization of Memristor and Higher Order Elements, 2013.

Scellier et al., Equilibrium Propagation: Bridging the Gap between Energy-Based Models and Backpropagation, published Mary 4, 2017, vol. 11, Article 24.

Wen et al: "An EDA framework for large scale hybrid neuromorphic computing systems", 2015 52nd ACM/EDAC/IEEE Design Automation Conference (DAC), IEEE, Jun. 8, 2015 (Jun. 8, 2015), pp. 1-6.

Jeong et al: "Parasitic Effect Analysis in Memristor-Array-Based Neuromorphic Systems", IEEE Transactions On Nanotechnology, IEEE, USA, vol. 17, No. 1, Jan. 1, 2018 (Jan. 1, 2018), pp. 184-193.

* cited by examiner

ANALOG SYSTEM USING EQUILIBRIUM PROPAGATION FOR LEARNING

CROSS REFERENCE TO OTHER APPLICATIONS

This application claims priority to U.S. Provisional Patent Application No. 62/886,800 entitled METHOD AND SYSTEM FOR PERFORMING ANALOG EQUILIBRIUM PROPAGATION filed Aug. 14, 2019 which is incorporated herein by reference for all purposes.

BACKGROUND OF THE INVENTION

In order to perform machine learning in hardware, particularly supervised learning, the desired output is to be achieved from a particular set of input data. For example, input data is provided to a first layer. The input data is multiplied by a matrix of values, or weights, in the layer. The output signals for the layer are the result of the matrix multiplication in the layer. The output signals are provided as the input signals to the next layer of matrix multiplications. This process may be repeated for a large number of layers. The final output signals of the last layer are desired to match a particular set of target values. To perform machine learning, the weights (e.g. resistances) in one or more of the layers are adjusted in order to bring the final output signals closer to the target values. Although this process can theoretically alter the weights of the layers to provide the target output, in practice, ascertaining the appropriate set of weights is challenging. Various mathematical models exist in order to aid in determining the weights. However, it may be difficult or impossible to translate such models into devices.

BRIEF DESCRIPTION OF THE DRAWINGS

Various embodiments of the invention are disclosed in the following detailed description and the accompanying drawings.

DETAILED DESCRIPTION

Figure 1A:
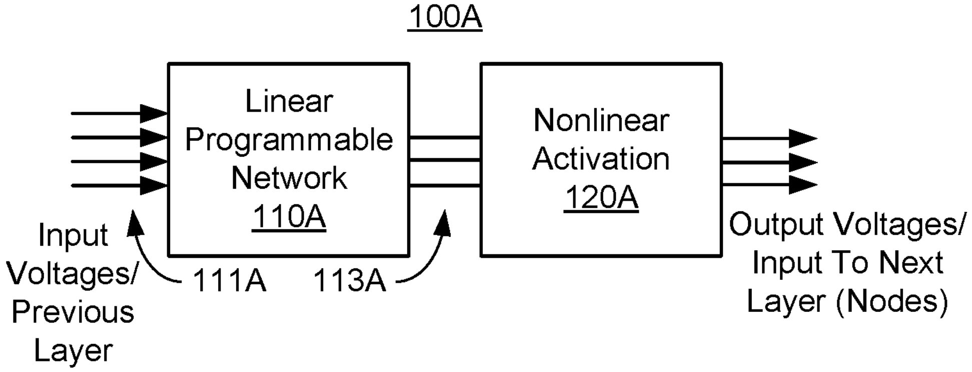
FIGS. 1A-1C are block diagrams depicting embodiments of analog systems for performing machine learning.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to perform machine learning in hardware systems, layers of matrix multiplications are utilized. The input signals (e.g. an input vector) are multiplied by a matrix of values, or weights, in each layer. This matrix multiplication may be carried out by a crossbar array in which the weights are resistances connecting each input to each output at each crossing of the array. The output signals for the layer are the result of the matrix multiplication in the layer. The output signals are provided as input signals to the next layer that performs another matrix multiplication (e.g. another crossbar array). This process may be repeated. To match the final output signals of the last layer to a set of target values, the weights in one or more of the layers are adjusted. Although this process can theoretically alter the weights of the layers to provide the target output, in practice, determining the weights based on the output is challenging. Various mathematical models exist in order to aid in determining the weights. However, it may be difficult or impossible to translate such models into analog architectures.

A system for performing learning is described. In some embodiments, the system is an analog system. The system includes a linear programmable network layer and a nonlinear activation layer. The linear programmable network layer includes inputs, outputs and linear programmable network components interconnected between the inputs and the outputs. The nonlinear activation layer is coupled with the outputs. The linear programmable network layer and the nonlinear activation layer are configured to have a stationary state at a minimum of a function which is a generalization of the power dissipation, commonly known as the "content" or "co-content" of the system. In some embodiments, multiple programmable network layers are interleaved with one or more nonlinear activation layers. In such embodiments, a nonlinear activation layer is connected to the outputs of one linear programmable network layer and to the inputs of an adjacent linear programmable network layer.

In some embodiments, the nonlinear activation layer further includes a nonlinear activation module and a regeneration module coupled with the outputs of the linear programmable network layer and with the nonlinear activation module. The regeneration module is configured to scale outputs signals from the outputs. In some embodiments, the regeneration module includes a bidirectional amplifier. In some embodiments, the nonlinear activation module includes a plurality of diodes.

The linear programmable network layer may include a programmable resistive network layer. In some embodiments, the programmable resistive network layer includes a fully connected programmable resistive network layer. For example, a crossbar array having programmable resistors (e.g. memristors) is used in some embodiments. In some embodiments, the programmable resistive network layer includes a sparsely connected programmable resistive network layer. For example, the programmable resistive network layer may include a partially connected crossbar array. In some embodiments, the programmable resistive network layer includes nanofibers and electrodes. In some embodiments, each of the nanofibers has a conductive core and a memristive layer surrounding at least a portion of the conductive core. A portion of the memristive layer is between the conductive core of the plurality of nanofibers and the plurality of electrodes. In some embodiments, each of the nanofibers has a conductive core and an insulating layer surrounding at least a portion of the conductive core. The insulating layer has apertures therein. In such embodiments, at least a portion of each the memristive plugs are in each of the apertures. Thus, the electrodes may be sparsely connected through the nanofibers.

The learning system may be utilized to perform machine learning. To do so, input signals are provided to the learning system including the linear programmable network layers interleaved with the nonlinear activation layer(s). The linear programmable network layers and the nonlinear activation layer(s) are configured to have a stationary state at minimum of a content of the learning system. The input signals thus result in output signals corresponding to the stationary state. The outputs of a first linear programmable network layer are perturbed. Thus, perturbation input signals are provided to the outputs of the first linear programmable network. In some embodiments, the perturbation input signals correspond to a second set of output signals that are closer to the target outputs than the output signals. As a result, perturbation output signals at the inputs of a second linear programmable network layer are generated. Gradient(s) for the linear programmable network components of the second linear programmable network layer are determined based on the perturbation output signals and the output signals. These gradient(s) may be determined utilizing equilibrium propagation. One or more of the linear programmable network components in the second linear programmable network layer are adjusted based on the gradient(s). This process may be performed iteratively in order to adjust the weights in one or more of the linear programmable network layers to achieve the target output signals from the input signals.

Figure 1B:
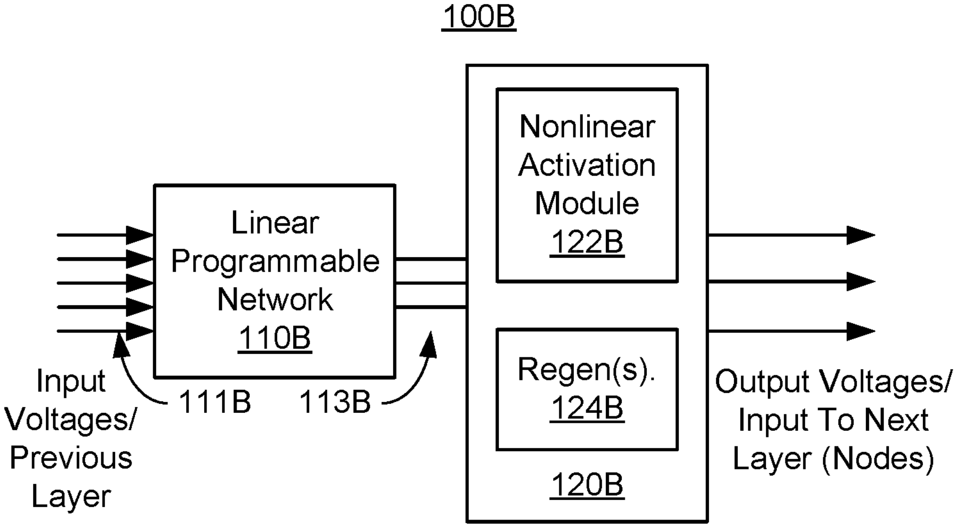
Figure 1C:
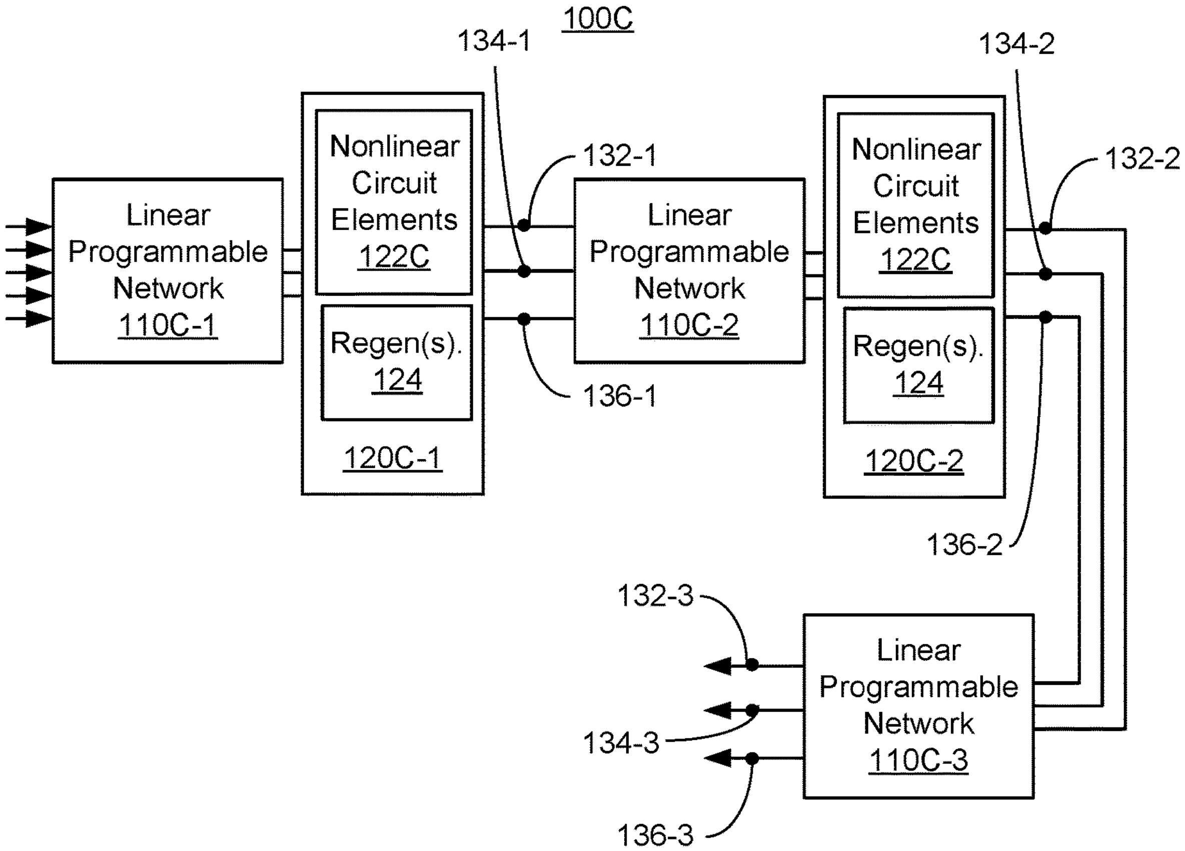

FIGS. 1A-1C are block diagrams depicting embodiments 100A, 100B and 100C, respectively, of analog systems for performing machine learning. Other and/or additional components may be present in some embodiments. Learning systems 100A, 100B and/or 100C may utilize equilibrium propagation to perform learning. Although described in the context of linear programmable network layers, in some embodiments, nonlinear programmable networks (e.g. network layers including nonlinear programmable components) may be used.

Referring to FIG. 1A, learning system 100A includes linear programmable network layer 110A and nonlinear activation layer 120A. Linear programmable network layer 110A and nonlinear activation layer 120A include analog circuits. Multiple linear programmable network layers 110A interleaved with nonlinear activation layer(s) 120A may be used in some embodiments. For simplicity, single layers 110A and 120A are shown. Linear programmable network layer 110A includes linear programmable components. As used herein, a linear programmable component has a linear relationship between voltage and current over at least a portion of the operating range. For example, passive linear components include resistors and memristors. A programmable component has a changeable relationship between the voltage and current. For example, a memristor may have different resistances depending upon the current previously driven through the memristor. Thus, linear programmable network layer 110A includes linear programmable components (e.g. programmable resistors and/or memristors) interconnected between inputs 111A and outputs 113A. In linear programmable network layer 110A, the linear programmable components may be fully connected (each component connected to all of its neighbors). In some embodiments, the linear programmable components are sparsely connected (not all components connected to all of its neighbors). Although described in the context of programmable resistors and memristors, in some embodiments, other components having linear impedances may be used in addition to or in lieu of programmable resistors and/or memristors.

Nonlinear activation layer 120A may be utilized to provide an activation function for the linear programmable network layer 110A. In some embodiments, nonlinear activation layer 120A may include one or more rectifiers. For example, a plurality of diodes may be used. In other embodiments, other and/or additional nonlinear components capable of providing activation functions may be used.

Linear programmable network layer 110A and nonlinear activation layer 120A are configured such that in response to input voltages, the output voltages from nonlinear activation layer 120A have a stationary state at a minimum of a content of linear programmable network layer 110A and nonlinear activation layer 120A. Stated differently, for a particular set of input voltages provided on inputs 111A, linear programmable network layer 110 and nonlinear activation layer 120 settle at a minimum of a function (the "content") corresponding to a generalized form of the power dissipated by the system and which corresponds to the input voltages. In some embodiments, such as some linear networks, the content corresponds to the power dissipated by the network. This content corresponds to a function of the difference in voltages of the corresponding input node 111A and output nodes 113A (e.g. the square of the voltage difference) and the resistance between the nodes 111A and 113A. Thus, learning system 100A minimizes a property of learning system 100A that is dependent upon input and output voltages as well as the impedances of linear programmable network 110A.

FIG. 1B depicts learning system 100B including linear programmable network layer 110B and nonlinear activation layer 120B. Linear programmable network layer 110B and nonlinear activation layer 120B include analog circuits and are analogous to linear programmable network layer 110A and nonlinear activation layer 120A, respectively. Multiple linear programmable network layers 110B interleaved with nonlinear activation layer(s) 120B may be used in some embodiments. For simplicity, single layers 110B and 120B are shown. Linear programmable network layer 110B includes linear programmable components. In linear programmable network layer 110B, the linear programmable components may be fully connected or sparsely connected. Although described in the context of programmable resistors and memristors, in some embodiments, other components having linear impedances may be used in addition to or in lieu of programmable resistors and/or memristors.

Nonlinear activation layer 120B may be utilized to provide an activation function for the linear programmable network layer 110B. In the embodiment shown, nonlinear activation layer 120B includes nonlinear activation module 122B and regeneration module 124B. Nonlinear activation module 122B is analogous to nonlinear activation layer 120A. Thus, nonlinear activation module 122B may include one or more diodes. In other embodiments, other and/or additional nonlinear components capable of providing activation functions may be used. Regeneration module 124B may be used to account for reductions in the amplitude of output voltages from linear programmable network layer 110B over multiple layers. Thus, regeneration module 124B is utilized to scale voltage and current in some embodiments. In some embodiments, regeneration module 124B is an amplifier, such as a bidirectional amplifier. For example, in some embodiments, regeneration module 124B scales voltage in the forward direction (toward output voltages/next layer) by a gain factor of G and scales current in the reverse direction (toward input voltages) by a factor of 1/G. In embodiments in which G=1, regeneration module acts as a short circuit. In some embodiments, therefore, regeneration module 124B may not affect the dynamics of components of linear programmable network layer 110B and nonlinear activation module 122B. Instead, regeneration module 124B scales up/down voltage and current.

Linear programmable network layer 110B and nonlinear activation layer 120B are configured such that in response to input voltages, the output voltages from nonlinear activation layer 120B have a stationary state at a minimum of a content for linear programmable network layer 110B and nonlinear activation layer 120B. Stated differently, for a particular set of input voltages provided on inputs 111B, linear programmable network layer 110A and nonlinear activation layer 120B settle at a minimum of the content corresponding to the input voltages. This content corresponds to the square of the difference in voltages of the corresponding input node 111B and output nodes 113B and the resistance between the nodes 111B and 113B. Thus, learning system 100B minimizes a property of learning system 100B that is dependent upon input and output voltages as well as the impedances of linear programmable network 110B.

FIG. 1C depicts learning system 100C including multiple linear programmable network layers 110C-1, 110C-2 and 110C-3 and nonlinear activation layers 120C-1 and 120C-2. Linear programmable network layers 110C-1, 110C-2 and 110C-3 and nonlinear activation layers 120C-1 and 120C-2 include analog circuits and are analogous to linear programmable network layer(s) 110A/110B and nonlinear activation layer(s) 120A/120B, respectively. Thus, multiple linear programmable network layers 110B interleaved with nonlinear activation layer(s) 120B may be used in some embodiments. Linear programmable network layers 110C-1, 110C-2 and 110C-3 each includes linear programmable components. In linear programmable network layers 110C-1, 110C-2 and 110C-3, the linear programmable components may be fully connected or sparsely connected. Although described in the context of programmable resistors and memristors, in some embodiments, other components having linear impedances may be used in addition to or in lieu of programmable resistors and/or memristors.

Nonlinear activation layers 120C-1 and 120C-2 may be utilized to provide an activation function for the linear programmable network layers 110C-1, 110C-2 and 110C-3. In the embodiment shown, each nonlinear activation layer 120C-1 and 120C-2 includes nonlinear activation module 122C-1 and 122C-2 and regeneration modules 124C-1 and 124C-2. Nonlinear activation modules 122C-1 and 122C-2 are analogous to nonlinear activation module 122B and nonlinear activation layer 120A. Regeneration modules 124C-1 and 124C-2 are analogous to regeneration module 124B. Thus, regeneration modules 124C-1 and 124C-2 are utilized to scale voltage and current in some embodiments. In some embodiments, regeneration modules 124C-1 and 124C-2 are analogous to regeneration module 124B and thus may include a bidirectional amplifier.

Linear programmable network layers 110C-1, 110C-2 and 110C-3 and nonlinear activation layers 120C-1 and 120C-2 are configured such that in response to input voltages, the output voltages on nodes 132-1, 134-1, 136-1, 132-2, 134-2, 136-2, 132-3, 134-3 and 136-3 have a stationary state at a minimum of a content for linear programmable network layers 110C-1, 110C-2 and 110C-3 and nonlinear activation layers 120C-1 and 120C-2. Stated differently, for a particular set of input voltages provided to linear programmable network layer 110C-1, learning system 100C settles at a minimum of the content corresponding to the input voltages. This content corresponds to the square of the difference in voltages of the corresponding inputs 111A and outputs nodes 113B. Thus, learning system 100C minimizes a property of learning system 100C that is dependent upon input and output voltages as well as the impedances of linear programmable network 110C.

Learning systems 100A, 100B and 100C may utilize equilibrium propagation to perform machine learning. Equilibrium propagation states that the gradient of the parameters of the network can be derived from the values of certain parameters at the nodes for certain functions, termed the "energy function" herein. Although termed the energy function, equilibrium propagation does not indicate that the "energy function" corresponds to a particular physical characteristic of an analog system. It has been determined that equilibrium propagation may be performed for an analog system (e.g. a network of impedances) having an "energy function" corresponding to the content. More particularly a pseudo-power can be utilized for equilibrium propagation. The pseudo-power corresponds to the content in some embodiments. The pseudo-power, and thus the content, is minimized by the system.

The pseudo-power may be given by:

$$E=\tfrac{1}{2}\Sigma_i\Sigma_j g_{ij}(v_i-v_j)^2 \qquad (1)$$

where, $g_{ij}$ is the conductance of the resistor connecting node i to node j, $v_i$ is the voltage at node i, and $v_j$ is the voltage at node j. In some embodiments, the pseudo-power may be given by a function analogous to equation (1). For a two terminal component, the pseudo-power is one half multiplied by the square of the voltage drop across the component divided by the resistance. Stated differently, the pseudo-power is one-half the power dissipated by the two-terminal component. Given fixed boundary node voltages $v_i$, the interior node voltages settle at a configuration which minimizes the above "energy" function (e.g. the content or pseudo-power). The factor of ½ may be ignored for the purposes of machine learning. Thus, in some embodiments, minimizing the content corresponds to minimizing power dissipated by the networks. Because the content is naturally minimized at a stable state, learning systems 100A, 100B and 100C allow for equilibrium propagation to be utilized for various purposes. For example, learning systems 100A, 100B and 100C allow for equilibrium propagation to be used in performing machine learning. Therefore, learning system 100A, 100B and 100C allow for the weights (impedances) of linear programmable networks 110A, 110B, 110C-1, 110C-2 and 110C-3 to be determined utilizing equilibrium propagation in conjunction with the input signals provided to the learning system, the resulting output signals for the linear programmable network layers, perturbation input signals provided to the outputs of the learning system, and the resulting perturbation output signals at the inputs for the linear programmable networks.

For example, machine learning may be performed using learning system 100C. Input signals (e.g. input voltages) are provided to linear programmable network layer 110C-1. As a result, a first set of output signals will result on nodes 132-1, 134-1 and 136-1. This first set of output signals are inputs to linear programmable network layer 110C-2 and result in a second set of output signals on nodes 132-2, 134-2 and 136-2. The second set of output signals are inputs to linear programmable network layer 110C-3 and result in a set of final output signals on nodes 132-3, 134-3 and 136-3. The output signals on nodes 132-1, 134-1, 136-1, 132-2, 134-2, 136-2, 132-3, 134-3, 136-3 correspond to a minimum in the content of learning system 100C (e.g. by linear programmable network layers 110C-1, 110C-2 and 110C-3). The output nodes 132-3, 134-3 and 136-3 are perturbed. For example, perturbation input signals (e.g. perturbation input voltages) are provided to outputs 132-3, 134-3 and 136-3. Stated differently, outputs 132-3, 134-3 and 136-3 are clamped at the perturbation voltages. These perturbation voltages can be selected to be closer to the desired, target voltages for outputs 132-3, 134-3 and 136-3. These perturbation signals propagate back through learning system 100C and result in a first set of perturbation output signals (voltages) on nodes 132-2, 134-2 and 136-2. This first set of perturbation output voltages are provided to the outputs of linear programmable network layer 110C-2. These perturbation signals propagate back through learning system 100C and result in a second set of perturbation output signals (voltages) on nodes 132-1, 134-1 and 136-1. These perturbation signals propagate back through learning system 100C and result in a final set of perturbation output signals (voltages) on the inputs of linear programmable network layer 110C-1. The perturbation output signals (voltages) on nodes 132-1, 134-1, 136-1, 132-2, 134-2, 136-2, 132-3, 134-3, 136-3 correspond to a minimum in the content of by learning system 100C (e.g. by linear programmable network layers 110C-1, 110C-2 and 110C-3) for the perturbation voltages provided at outputs nodes 132-3, 134-3 and 136-3.

Utilizing the output signals on nodes 132-1, 134-1, 136-1, 132-2, 134-2, 136-2, 132-3, 134-3, 136-3 for the input voltages and the perturbation output signals on nodes 132-1, 134-1, 136-1, 132-2, 134-2, 136-2, 132-3, 134-3, 136-3 for the perturbation input signals in combination with equilibrium propagation, the gradients for the weights (e.g. impedances) for linear programmable networks 110C-1, 110C-2 and 110C-3 may be determined.

For example, input voltages X representing input data are presented to the input nodes of the learning system 100C (boundary voltages), and the interior nodes 132-1, 134-1, 136-1, 132-2, 134-2, 136-2, 132-3, 134-3, and 136-3 (including output nodes 132-3, 134-3, and 136-3) settle to a minimum of the energy function (e.g. the content). These output signals (node voltages) are denoted $S^{free}$. The output nodes 132-3, 134-3 and 136-3 of learning system 100C are then "pushed" in the direction of a set of target signals (e.g. target voltages) Y. Stated differently, perturbation voltages are provided to the output nodes 132-3, 134-3 and 136-3. For example, Y may be the true label in a classification task. Learning system 100C settles to a new minimum of the energy, and the new "weakly clamped" node voltages (e.g. the perturbation output voltages) are denoted $S^{clamped}$.

According to equilibrium propagation, the gradient of the parameters of the network (the impedance values for each of the linear programmable components in each of the linear programmable network layers) with respect to an error or loss function L can be derived directly from $S^{free}$ and $S^{clamped}$. This gradient can then be used to modify the conductances (and thus impedances) of the linear programmable components (e.g. alter $g_{ij}$). For example, memristors may be programmed by driving the appropriate current through the memristors. Thus, learning system 100C may be trained to optimize a well-defined objective function L. Stated differently, learning system 100C may perform machine learning utilizing equilibrium propagation. For similar reasons, learning systems 100A and 100B may also utilize equilibrium propagation to perform machine learning.

Thus, modification of the weights (impedances) in learning systems 100A, 100B and/or 100C may be determined using equilibrium propagation. As indicated in learning system 100C, the modification of the impedances can be determined for learning systems including multiple layers. Thus, utilizing the output signals for learning systems 100A, 100B and 100C, equilibrium propagation can be used to carry out back propagation and train learning system 100A, 100B and/or 100C. The addition of nonlinear activation layers 120A, 120B, 120C-1 and 120C-2 also allows for more complex separation of data by learning systems 100A, 100B and 100C. Consequently, machine learning may be better able to be performed using analog architectures that may be readily achieved.

Figure 2A:
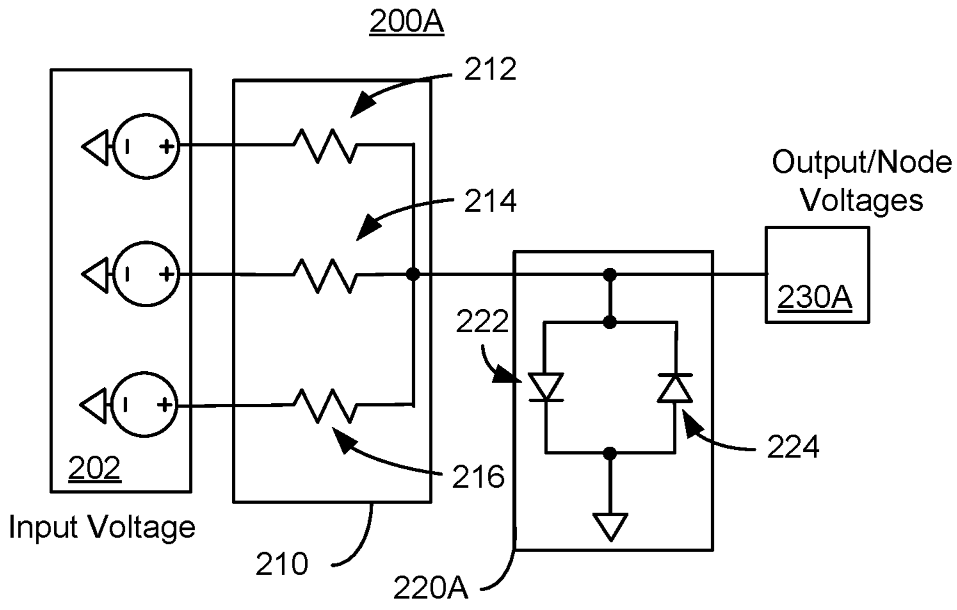
FIGS. 2A-2B depict embodiments of analog systems for performing machine learning.
Figure 2B:
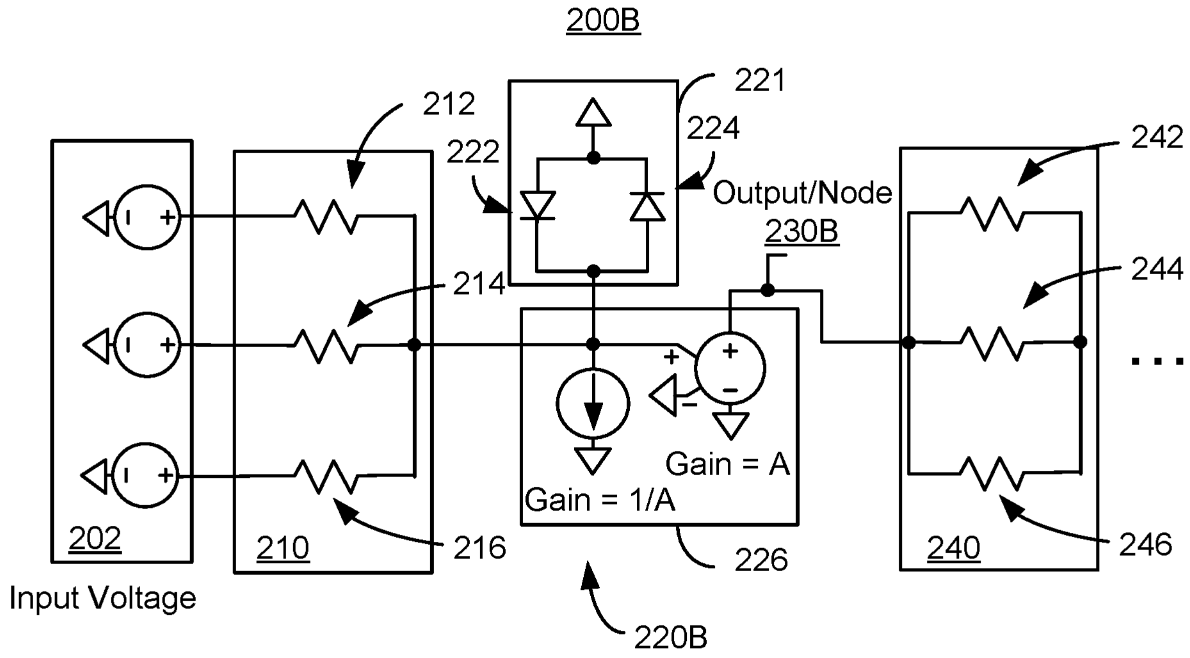

FIGS. 2A-2B depict embodiments of learning systems 200A and 200B that may use equilibrium propagation to perform machine learning. Although described in the context of linear programmable network layers, in some embodiments, nonlinear programmable networks (e.g. network layers including nonlinear programmable components) may be used. Referring to FIG. 2A, learning system 200A analogous to learning system 100A is shown. Learning system 200A includes linear programmable network layer 210 and nonlinear activation layer 220A analogous to linear programmable network layer 110A and nonlinear activation layer 120A, respectively. Multiple linear programmable network layers 210 interleaved with nonlinear activation layer(s) 220A may be used in some embodiments. Further, learning system 200A may be replicated in parallel to provide a first layer in a more complex learning system. Such a first layer may be replicated in series, with the output of one layer being the input for the next layer, in some embodiments. In other embodiments, the linear programmable network layers and/or the nonlinear activation layers need not be the same. For simplicity, single layers 210 and 220A are shown. Also explicitly shown are voltage inputs 202, which provide input voltages (e.g. input signals) to the inputs of linear programmable network layer 210.

Linear programmable network layer 210 includes linear programmable components. More specifically, linear programmable network layer 210 includes programmable resistors 212, 214 and 216. In some embodiments, programmable resistors 212, 214 and 216 are memristors. However, other and/or additional programmable passive components may be used in some embodiments.

Nonlinear activation layer 220A may be utilized to provide an activation function for the linear programmable network layer 210. Activation layer 220A thus includes a two-terminal circuit element whose I-V curve is weakly monotonic. In the embodiment shown, nonlinear activation layer 220A includes diodes 222 and 224. Thus, diodes 222 and 224 are used to create a sigmoid nonlinearity as activation function. In other embodiments, a more complex layer having additional resistors and/or a different arrangement of resistors including more nodes and multiple activation functions might be used.

In operation, input signals (e.g. input voltages) are provided to linear programmable network layer 210. As a result, an output signal results on node 230A. The output signal propagates to the subsequent layers (not shown). The output signals on final nodes as well as on interior nodes (e.g. on node 230A) correspond to a minimum in the energy dissipated by learning system 200A for the input voltages. The output (e.g. node 230A or a subsequent output) is perturbed. The perturbation voltage(s) are selected to be closer to the desired, target voltages for the outputs. These perturbation signals propagate back through learning system 200C and result in perturbation output signals (voltages) on nodes 202. The perturbation output signals (voltages) on inputs 202 and any interior nodes (e.g. node 230A for a multi-layer learning system) correspond to a minimum in the energy dissipated by learning system 200A for the perturbation voltages.

Utilizing the output voltages on the interior and exterior nodes for the input voltages and the perturbation output signals on inputs 202 and interior nodes for the perturbation input signals in combination with equilibrium propagation, the gradients for the weights (e.g. impedances) for each programmable resistor (e.g. programmable resistors 212, 214 and 216) in each linear programmable network layer (e.g. layer 210) may be determined. Thus, machine learning may be more readily carried out in learning systems 200A. Thus, performance of analog learning system 200A may be improved.

FIG. 2B depicts a circuit diagram of an embodiment of learning system 200B that may use equilibrium propagation to perform machine learning. Learning system 200B is analogous to learning system 100B and learning system 200A. Learning system 200B includes linear programmable network layer 210 and nonlinear activation layer 220A analogous to linear programmable network layer 110A/210 and nonlinear activation layer 120A/220A, respectively. Multiple linear programmable network layers 210 interleaved with nonlinear activation layer(s) 220B may be used in some embodiments. Further, learning system 200B may be replicated in parallel to provide a first layer in a more complex learning system. Such a first layer may be replicated in series, with the output of one layer being the input for the next layer, in some embodiments. Thus, an additional linear programmable network layer 240 having resistors 242, 244 and 246 is shown. In other embodiments, each linear programmable network layer need not be the same. Also explicitly shown are voltage inputs 202, which provide input voltages (e.g. input signals) to the inputs of linear programmable network layer 210B.

Linear programmable network layer 210B includes programmable resistors 212, 214 and 216. In some embodiments, programmable resistors 212, 214 and 216 are memristors. However, other and/or additional programmable passive components may be used in some embodiments.

Nonlinear activation layer 220B includes nonlinear activation module 221 and regeneration module 226. Nonlinear activation module 221 may be utilized to provide an activation function for the linear programmable network layer 210 and is analogous to nonlinear activation layer 220A. Nonlinear activation module 211 thus includes diodes 222 and 224. In other embodiments, a more complex layer having additional resistors and/or a different arrangement of resistors including more nodes and multiple activation functions might be used.

The input voltages to inputs 202 may have mean zero and unit standard deviation. In practice, the output voltages of a layer of resistors has a significantly smaller standard deviation (the voltages will be closer to zero) than the inputs. To prevent signal decay, the output voltages may be amplified at each layer. Thus, regeneration module 226 is used. Regeneration module 226 is a feedback amplifier that may act as a buffer between inputs and outputs. However, a backwards influence is used to propagate gradient information. Thus, regeneration module 226 is a bidirectional amplifier in the embodiment shown. Voltages in the forward direction are amplified by a gain factor A. Currents in the backward direction are amplified by a gain factor 1/A. If the gain is set to A=1, then amplifier 226 behaves as a short circuit, not influencing the solution to the minimization problem. If the gain is set to a higher number, A=4 for instance, the dynamics of the output are simply re-scaled by a factor of approximately four. In this schema, voltage variables carry forward the input information to perform an inference, and current variables travel backwards carrying gradient information.

The voltage amplification by amplifier 226 in the forward direction may be performed by a voltage-controlled voltage source (VCVS). The current amplification in the backward direction may be performed by a current-controlled current source (CCCS). The control current into the CCCS is given by the current sourced by the VCVS. The CCCS reflects this current backwards, reducing it by the same factor as the forward gain. In this way, injected current at the output nodes can be propagated backwards, carrying the correct gradient information. In some embodiment, a more complex layer 220B having additional resistors and/or a different arrangement of resistors including more nodes and multiple activation functions might be used.

In operation, input signals (e.g. input voltages) are provided to linear programmable network layer 210. As a result, an output signal results on node 230B. The output signal propagates to the subsequent layers (e.g. linear programmable network layer 240). The output signals on final nodes as well as on interior nodes (e.g. on node 230B) correspond to a minimum in the energy dissipated by learning system 200B for the input voltages. The output (e.g. a subsequent output) is perturbed. The perturbation voltage(s) are selected to be closer to the desired, target voltages for the outputs. These perturbation signals propagate back through learning system 200B and result in perturbation output signals (voltages) on nodes 202 as well as other interior nodes. The perturbation output signals (voltages) on inputs 202 and any interior nodes (e.g. node 230B for a multi-layer learning system) correspond to a minimum in the energy dissipated by learning system 200B for the perturbation voltages.

Utilizing the output voltages on the interior and exterior nodes for the input voltages and the perturbation output signals on inputs 202 and interior nodes for the perturbation input signals in combination with equilibrium propagation, the gradients for the weights (e.g. impedances) for each programmable resistor (e.g. programmable resistors 212, 214, 216, 242, 244 and 246) in each linear programmable network layer (e.g. layer 210 and 240) may be determined. Thus, machine learning may be more readily carried out in learning systems 200B. Thus, performance of analog learning system 200B may be improved.

Figure 3:
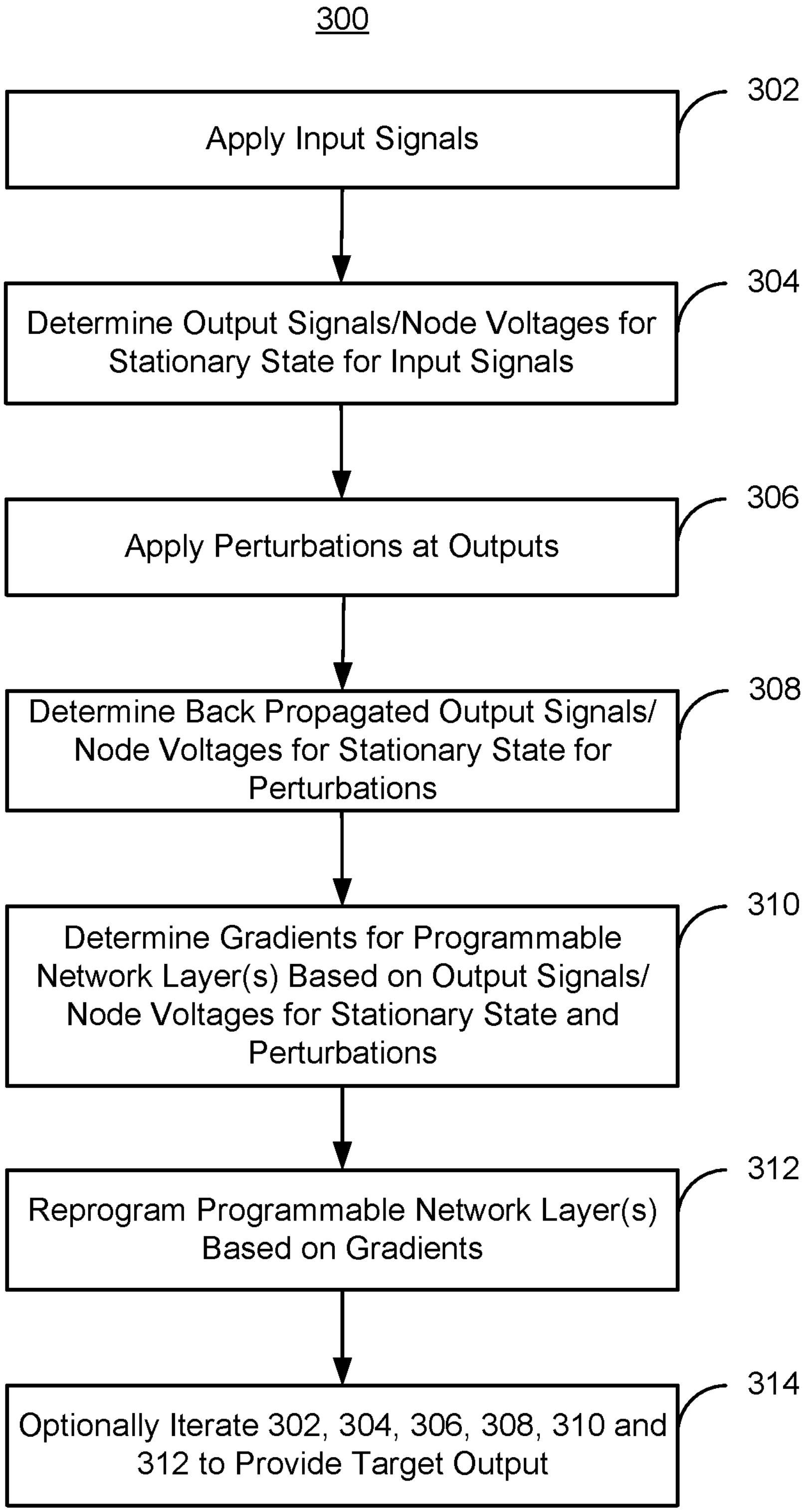
FIG. 3 is a flow chart depicting an embodiment of a method for performing machine learning.

FIG. 3 is a flow chart depicting an embodiment of method 300 for performing machine learning using equilibrium propagation. For clarity, only some steps are shown. Other and/or additional procedures may be carried out in some embodiments. Although described in the context of linear programmable network layers, in some embodiments, method 300 may be utilized with nonlinear programmable networks (e.g. network layers including nonlinear programmable components).

Input signals (e.g. input voltages) are provided to the inputs of the first linear programmable network layer, at 302. The input signals rapidly propagate through the learning system. As a result, output signals occur on interior nodes (e.g. the outputs of each linear programmable network layer), as well as the outputs of the learning system (e.g. the outputs of the last linear programmable network layer). The output signals on final nodes as well as on interior nodes correspond to stationary state for a minimum in the energy dissipated by the learning system for the input voltages provided in 302. These outputs signals are determined for interior and exterior nodes, at 304.

The outputs are perturbed, at 306. In some embodiments, perturbation signals (e.g. voltages) are applied to the outputs of the last linear programmable network layer. In some embodiments, perturbation signals are applied at one or more interior nodes. The perturbation signal(s) provided at 306 are selected to be closer to the desired, target voltages for the outputs. These perturbation signals propagate back through the learning system and result in perturbation output signals (voltages) on the inputs as well as other interior nodes. The perturbation output signals (voltages) on inputs 202 and any interior nodes (e.g. node 230B for a multi-layer learning system) correspond to a minimum in the energy dissipated by learning system 200B for the perturbation voltages. These perturbation output signals are determined, at 308.

Utilizing the output voltages on the interior and exterior nodes for the input voltages and the perturbation output signals on inputs and interior nodes for the perturbation input signals in combination with equilibrium propagation, the gradients for the weights (e.g. impedances) for each linear programmable component in each linear programmable network layer is determined, at 310. The linear programmable components are reprogrammed based on the gradients determined, at 312. For example, the impedance of the linear programmable components (e.g. memristors) may be changed at 312. At 314, 302, 304, 306, 308, 310 and 312 may be repeatedly iterated through to obtain the appropriate weights for the target outputs. Thus, machine learning may be more readily carried out in analog learning systems. Thus, performance of analog learning systems may be improved using method 300.

Figure 4:
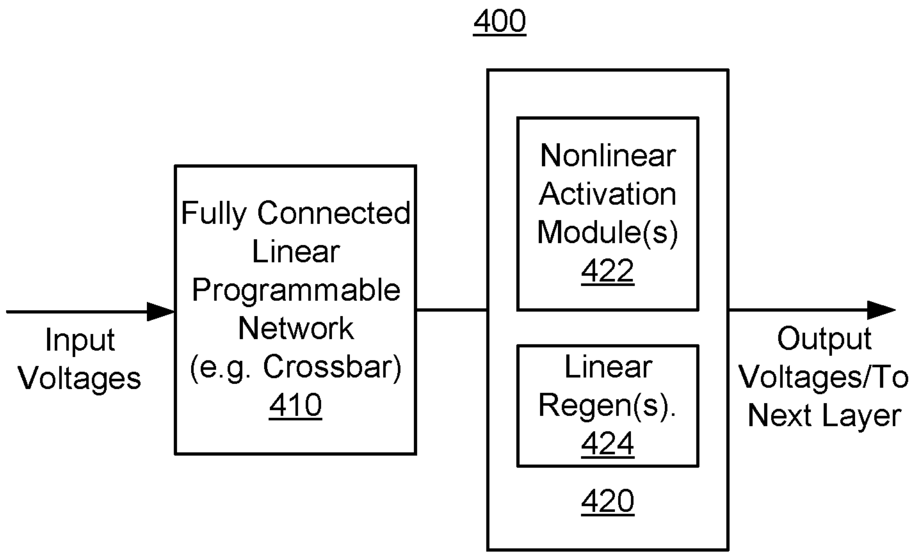
FIG. 4 is a block diagram depicting an embodiment of an analog system for performing machine learning utilizing equilibrium propagation.

FIG. 4 depicts and embodiment of learning system 400 that may use equilibrium propagation to perform machine learning. Learning system 400 includes fully connected linear programmable network layer 410 and nonlinear activation layer 420 analogous to linear programmable network layer 110B and nonlinear activation layer 120B, respectively. Multiple linear programmable network layers 410 interleaved with nonlinear activation layer(s) 420 may be used in some embodiments. Although described in the context of linear programmable network layers, in some embodiments, nonlinear programmable networks (e.g. network layers including nonlinear programmable components) may be used.

Figure 5:
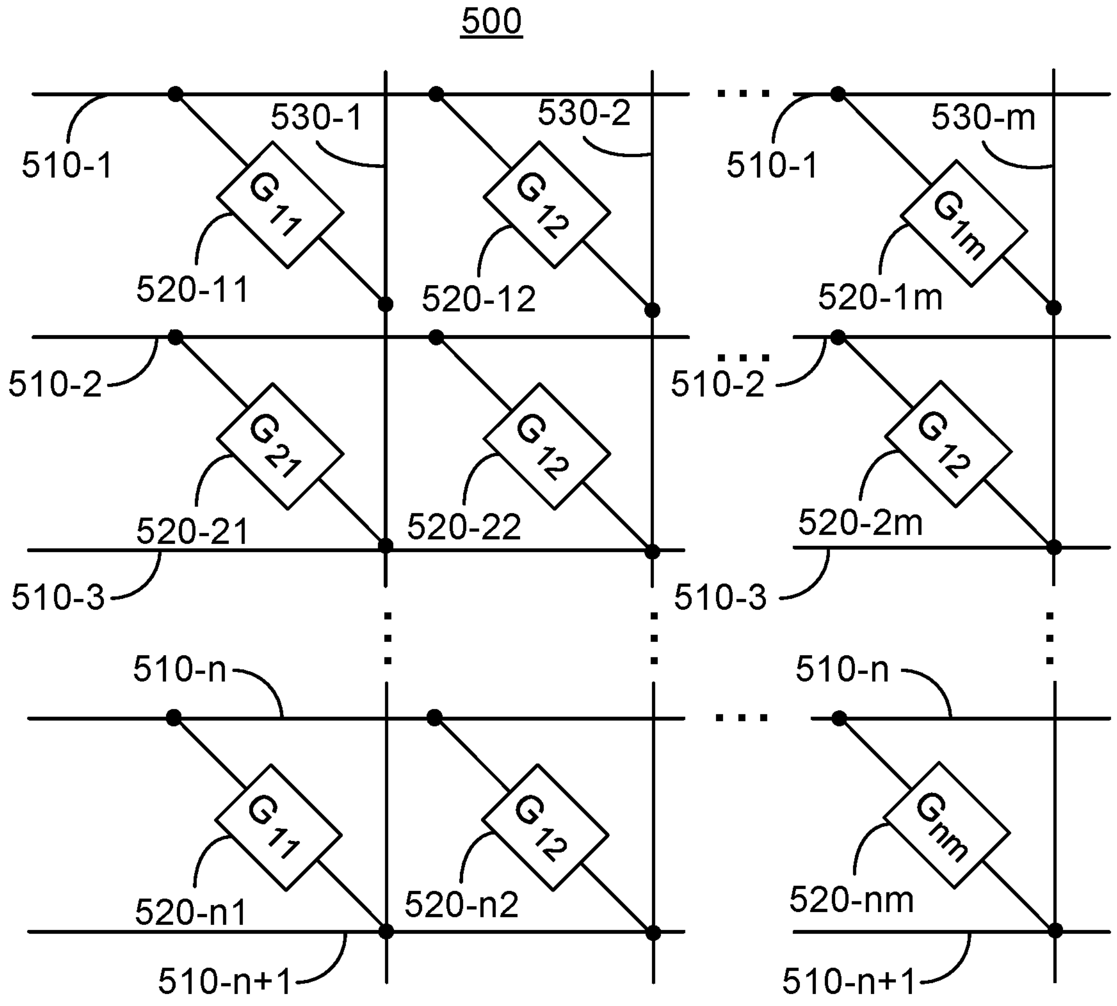
FIG. 5 is a diagram depicting an embodiment of an analog system for performing machine learning utilizing equilibrium propagation.

Linear programmable network layer 410 includes fully connected linear programmable components. Thus, each linear programmable component is connected to all of its neighbors. For example, FIG. 5 depicts a crossbar array 500 that may be used for fully connected linear programmable network layer 410. Crossbar array 500 includes horizontal lines 510-1 through 510-($n$+1), vertical lines 530-1 through 530-$m$ and programmable conductances 520-11 through 520-$nm$. In some embodiments, programmable conductances 520-11 through 520-$nm$ are memristors. In some embodiments, programmable conductances 520-11 through 520-$nm$ may be memristive fibers laid out in a crossbar array. As can be seen in FIG. 5, each horizontal line 510-1 through 510-($n$+1) is connected at each crossing to each vertical line 530-1 through 530-$m$ through programmable conductances 520-11 through 520-$nm$. Thus, crossbar array 500 is a fully connected network that may be used for programmable network layer 410.

Referring back to FIG. 4, nonlinear activation layer 420 may be utilized to provide an activation function for the linear programmable network layer 410. Activation layer 420 includes nonlinear activation module(s) 422 and linear regeneration module(s) 424. Nonlinear activation module may include one or more activation modules such as module 221. Similarly, linear regeneration module 424 may include one or more regeneration module(s) 226. Learning system 400 functions in an analogous manner to learning systems 100A, 100B, 100C, 200A and 200B and may utilize method 300. Thus, performance of analog learning system 400 may be improved.

Figure 6:
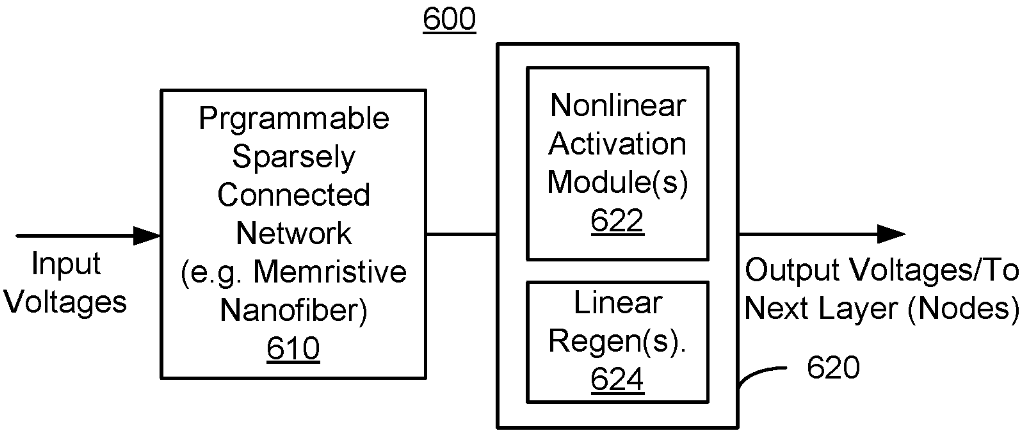
FIG. 6 is a block diagram depicting an embodiment of an analog system for performing machine learning.

FIG. 6 depicts and embodiment of learning system 600 that may use equilibrium propagation to perform machine learning. Learning system 600 includes sparsely connected linear programmable network layer 610 and nonlinear activation layer 620 analogous to linear programmable network layer 610B and nonlinear activation layer 620B, respectively. Multiple linear programmable network layers 610 interleaved with nonlinear activation layer(s) 620 may be used in some embodiments. Although described in the context of linear programmable network layers, in some embodiments, nonlinear programmable networks (e.g. network layers including nonlinear programmable components) may be used.

Linear programmable network layer 610 includes sparsely connected linear programmable components. Thus, not every linear programmable component is connected to all of its neighbors. Nonlinear activation layer 620 may be utilized to provide an activation function for the linear programmable network layer 610. Activation layer 620 includes nonlinear activation module(s) 622 and linear regeneration module(s) 624. Nonlinear activation module may include one or more activation modules such as module 221. Similarly, linear regeneration module 624 may include one or more regeneration module(s) 626. Learning system 600 functions in an analogous manner to learning systems 100A, 100B, 100C, 200A and 200B and may utilize method 300. Thus, performance of analog learning system 600 may be improved.

Figure 7:
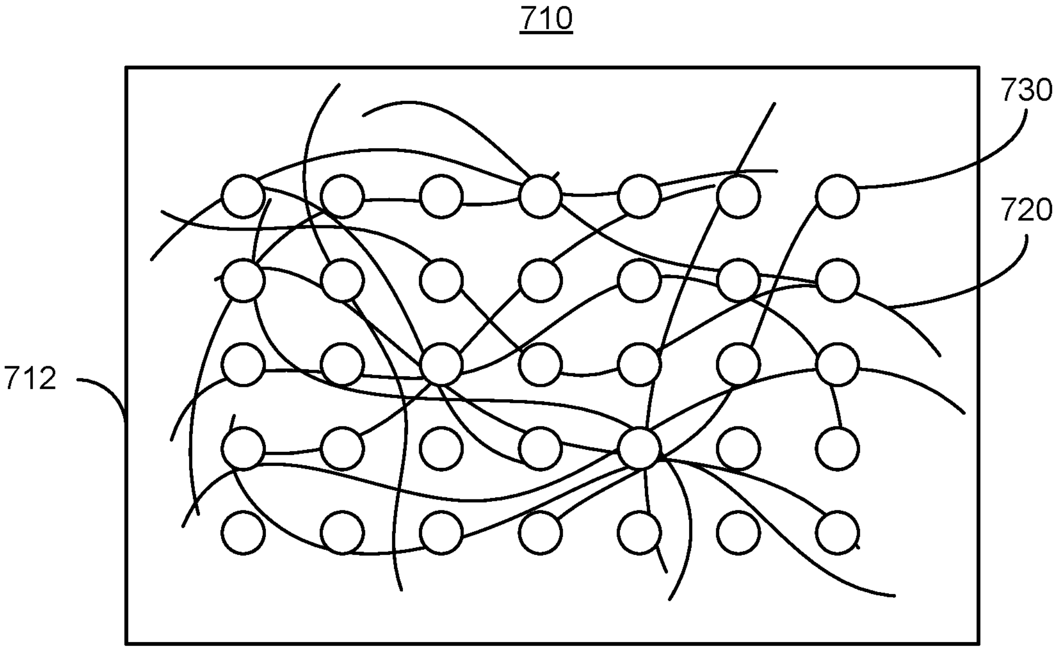
FIG. 7 is a diagram depicting an embodiment of a portion of an analog system for performing machine learning utilizing equilibrium propagation.

FIG. 7 depicts a plan view of an embodiment of sparsely connected network 710 usable in linear programmable network layer 610. Network 710 includes nanofibers 720 and electrodes 730. Electrodes 730 are sparsely connected through nanofibers 720. Nanofibers 720 may be laid out on the underlying layers. Nanofibers 720 may be covered in an insulator and electrodes 730 provided in vias in the insulators.

Figure 8A:
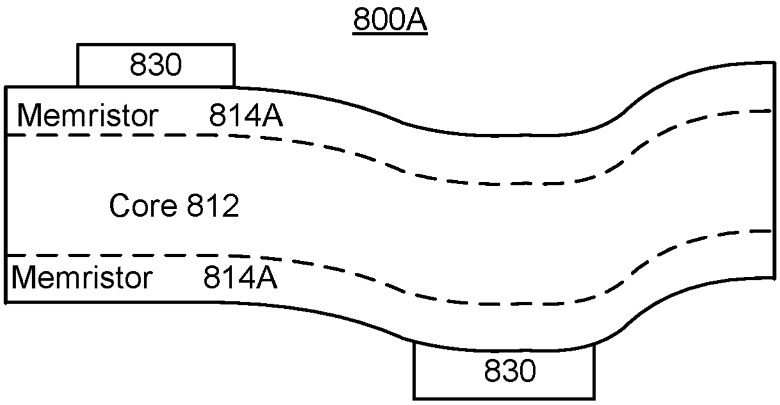
FIGS. 8A-8B are diagrams depicting embodiments of nanofibers.
Figure 8B:
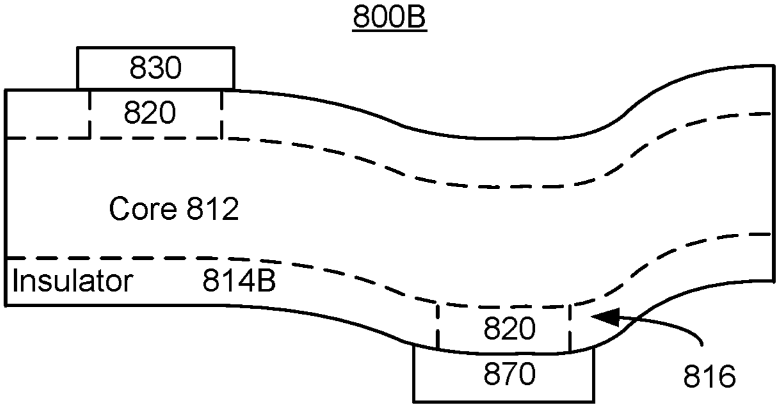

FIGS. 8A and 8B depict embodiments of nanofibers 800A and 800B that may be useable as nanofibers 720. In some embodiments, only nanofibers 800A are used. In some embodiments only nanofibers 800B are used. In some embodiments, nanofibers 800A and 800B are used. Nanofiber 800A of FIG. 8A includes core 812 and memristive layer 814A. Other and/or additional layers may be present. Also shown in FIG. 8A are electrodes 830. The diameter of conductive core 812 may be not larger than the nanometer regime in some embodiments. In some embodiments, the diameter of core 812 is on the order of tens of nanometers. In some embodiments, the diameter of core 812 may be not more than ten nanometers. In some embodiments, the diameter of core 812 is at least one nanometer. In some embodiments, the diameter is at least ten nanometers and less than one micrometer. However, in other embodiments, the diameter of core 812 may be larger. For example, in some embodiments, the diameter of core 812 may be 1-2 micrometers or larger. In some embodiments, the length of nanofiber 810 along the axis is a least one thousand multiplied by the diameter of core 812. In other embodiments, the length of nanofiber 810 may not be limited based on the diameter of conductive core 812. In some embodiments, the cross section of nanofiber 810 and conductive core 812 is not circular. In some such embodiments, the lateral dimension(s) of core 812 are the same as the diameters described above.

Conductive core 812 may be a monolithic (including a single continuous piece) or may have multiple constituents. For example, conductive core 812 may include multiple conductive fibers (not separately shown) which may be braided or otherwise connected together. Conductive core 812 may be a metal element or alloy, and/or other conductive material. In some embodiments, for example, conductive core 812 may include at least one of Cu, Al, Ag, Pt, other noble metals, and/or other materials capable of being formed into a core of a nanofiber. For example, in some embodiments, conductive core 812 may include or consist of one or more conductive polymers (e.g. PEDOT:PSS, polyaniline) and/or one or more conductive ceramics (e.g. indium tin oxide/ITO).

Memristive layer 814A surrounds core 812 along its axis in some embodiments. In other embodiments, memristive layer 814A may not completely surround core 812. In some embodiments, memristive layer 814A includes $HfO_x$, $TiO_x$ (where x indicates various stoichiometries) and/or another memristive material. In some embodiments, memristive layer 814A consists of HfO. Memristive layer 814A may be monolithic, including a single memristive material. In other embodiments, multiple memristive materials may be present in memristive layer 814A. In other embodiments, other configurations of memristive material(s) may be used. However, memristive layer 814A is desired to reside between electrodes 830 and core 812. Thus, nanofiber 800A has a programmable resistance between electrodes.

Nanofiber 800B includes core 812 and insulator 814B. Also shown are memristive plugs 820 and electrodes 870. Core 812 of nanofiber 800B is analogous to core 812 of nanofiber 800A. Insulator 814B coats conductive core 812, but has apertures 816 therein. In some embodiments, insulator 814B is sufficiently thick to electrically insulate conductive core 812 in the regions that insulator 814B covers conductive core 812. For example, insulator 814B may be at least several nanometers to tens of nanometers thick. In some embodiments, insulator 814B may be hundreds of nanometers thick. Other thicknesses are possible. In some embodiments, insulator 814B surrounds the sides of conductive core 812 except at apertures 816. In other embodiments, insulator 814B may only surround portions of the sides of core conductive 812. In such embodiments, another insulator (not shown) may be used to insulate conductive core 812 from its surroundings. For example, in such embodiments, an insulating layer may be deposited on exposed portions of conductive core 812 during fabrication of a device incorporating nanofiber 800B. In some embodiments, a barrier layer may be provided in apertures 816. Such a barrier layer resides between conductive core 812 and memristive plug 820. Such a barrier layer may reduce or prevent migration of material between conductive core 812 and memristive plug 820. However, such a barrier layer is conductive in order to facilitate connection between conductive core 812 and electrode 830 through memristive plug 820. In some embodiments, insulator 114 includes one or more of $SiO_2$, $HfO_2$, $Ta_2O_5$, $Al_2O_3$ and polyvinylpyrrolidone (PVP)

Memristive plugs 820 reside in apertures 816. In some embodiments, memristive plugs 820 are entirely within apertures 816. In other embodiments, a portion of memristive plugs 820 is outside of aperture 816. In some embodiments, memristive plugs 820 may include $HfO_x$, $TiO_x$ (where x indicates various stoichiometries) and/or another memristive material. In some embodiments, memristive plugs 820 consist of HfO. Memristive plugs 820 may be monolithic, including a single memristive material. In other embodiments, multiple memristive materials may be present in memristive plugs 920. For example, memristive plugs 820 may include multiple layers of memristive materials. In other embodiments, other configurations of memristive material(s) may be used.

Figure 9:
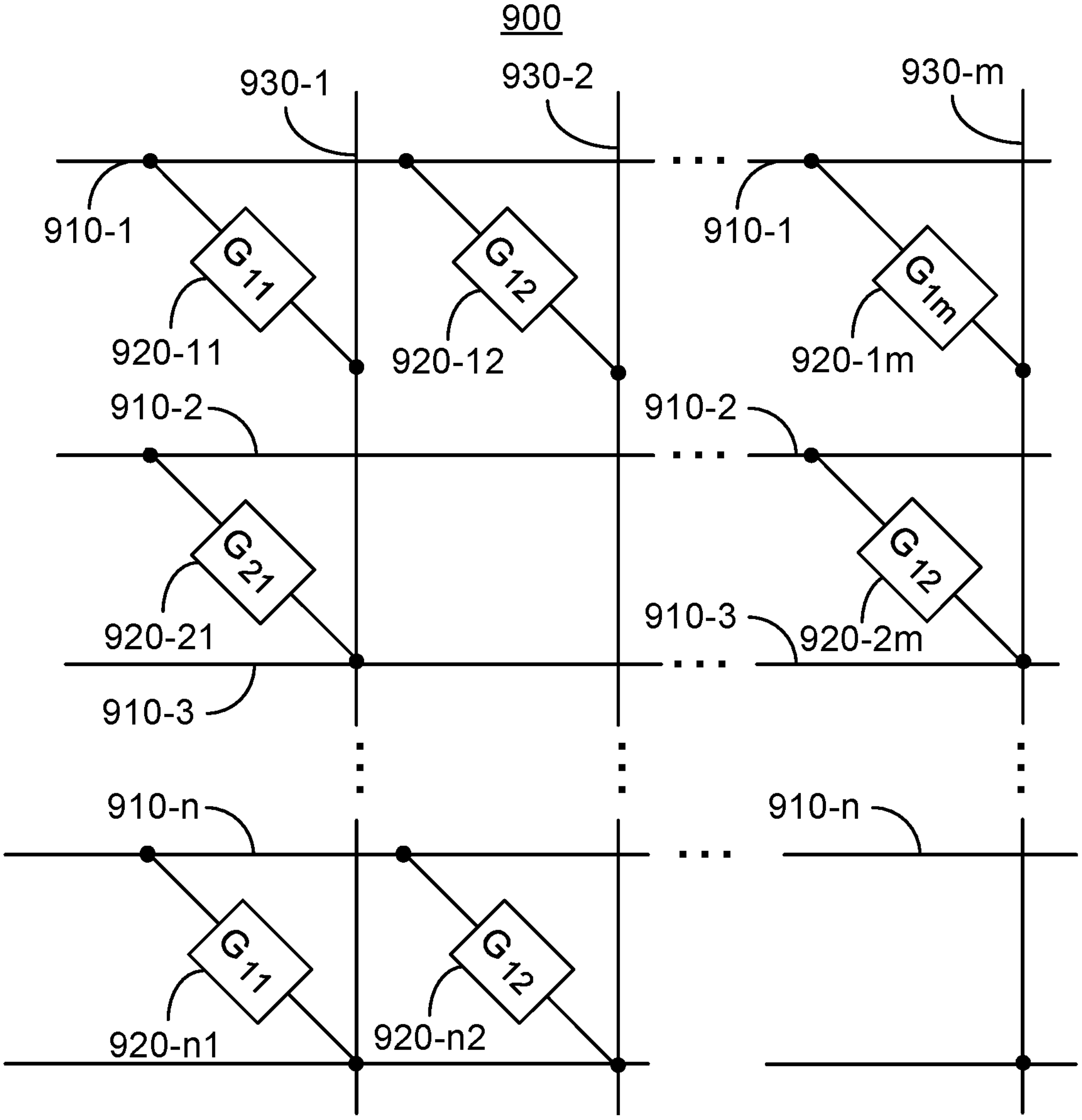
FIG. 9 is a diagram depicting an embodiment of a system for performing machine learning utilizing equilibrium propagation.

FIG. 9 depicts an embodiment of sparsely connected crossbar array 900 that may be used for sparsely connected linear programmable network layer 610. Crossbar array 900 includes horizontal lines 910-1 through 910-($n$+1), vertical lines 930-1 through 930-$m$ and programmable conductances 920-11 through 920-$nm$. In some embodiments, programmable conductances 920-11 through 920-$nm$ are memristors. In some embodiments, programmable conductances 920-11 through 920-$nm$ may be memristive fibers laid out in a crossbar array. As can be seen in FIG. 9, some conductances are missing. Thus, not all horizontal lines 910-1 through 910-($n$+1) are connected at each crossing to all vertical lines 930-1 through 930-$m$ through programmable conductances 920-11 through 920-$nm$. For example, line 930-2 is not connected to line 910-2. Similarly, line 910-$n$ is not connected to line 930-$n$. Thus, crossbar array 900 is a sparsely connected network that may be used for programmable network layer 910. Thus, sparsely connected networks 900 and/or 700 can be used in linear programmable network layers configured to be utilized with equilibrium propagation. Thus, system performance may be improved.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for performing learning, comprising:

a linear programmable network layer including a plurality of inputs, a plurality of outputs and a plurality of linear programmable network components interconnected between the plurality of inputs and the plurality of outputs;

a nonlinear activation layer coupled with the plurality of outputs, wherein the nonlinear activation layer further includes:

a nonlinear activation module; and a regeneration module coupled with the plurality of outputs and with the nonlinear activation module, the regeneration module being configured to scale a plurality of output signals from the plurality of outputs, wherein the regeneration module includes a bidirectional amplifier, wherein the regeneration module scales voltage in a forward direction towards output voltages or a next layer by a gain factor of G, wherein the regeneration module scales current in a reverse direction towards input voltages by a gain factor of 1/G, and wherein in the event that G is equal to 1, the regeneration module behaves as a short circuit and maintains a minimum of a content for the system such that in response to the input voltages, the output voltages have a stationary state at the minimum of the content for the linear programmable network layer and the nonlinear activation layer; and an additional linear programmable layer including an additional plurality of inputs, an additional plurality of outputs, and an additional plurality of linear programmable network components interconnected between the additional plurality of inputs and the additional plurality of outputs, the nonlinear activation layer coupled to the additional plurality of inputs, wherein the linear programmable network layer, the nonlinear activation layer, and the additional linear programmable layer are configured to have the stationary state at the minimum of the content for the system, the content for the system corresponding to a pseudo-power for electrical characteristics of the system, wherein a plurality of input signals provided to the plurality of inputs result in a plurality of output signals at the plurality of outputs, result in an additional plurality of output signals at the additional plurality of outputs, and correspond to the stationary state, and wherein the plurality of additional outputs are configured to receive a plurality of perturbations that results in a plurality of perturbation output signals at the plurality of outputs, the plurality of outputs including a plurality of nodes configured to measure the plurality of perturbation output signals, a gradient for the plurality of linear programmable network components of the linear programmable network layer being based on the plurality of perturbation output signals and the plurality of output signals, at least one of the plurality of linear programmable network components in the linear programmable network layer being configured to be reprogrammed based on the gradient.

2. The system of claim 1, wherein the linear programmable network layer includes a programmable resistive network layer.

3. The system of claim 2, wherein the programmable resistive network layer includes a fully connected programmable resistive network layer.

4. The system of claim 3, wherein the fully connected programmable resistive network layer includes a crossbar array including a plurality of programmable resistors.

5. The system of claim 4, wherein the plurality of programmable resistors includes a plurality of memristors.

6. The system of claim 2, wherein the programmable resistive network layer includes a sparsely connected programmable resistive network layer.

7. The system of claim 6, wherein the programmable resistive network layer includes a partially connected crossbar array.

8. The system of claim 6, wherein the programmable resistive network layer includes:

a plurality of nanofibers, each of the plurality of nanofibers having a conductive core and a memristive layer surrounding at least a portion of the conductive core; and a plurality of electrodes, a portion of the memristive layer being between the conductive core of the plurality of nanofibers and the plurality of electrodes.

9. The system of claim 6, wherein the programmable resistive network layer includes:

a plurality of nanofibers, each of the plurality of nanofibers having a conductive core and an insulating layer surrounding at least a portion of the conductive core, the insulating layer having a plurality of apertures therein;

a plurality of memristive plugs for the plurality of apertures, at least a portion of each of the plurality of memristive plugs residing in each of the plurality of apertures; and a plurality of electrodes, the plurality of memristive plugs being between the conductive core and the plurality of electrodes.

10. The system of claim 1, wherein the nonlinear activation layer includes a plurality of diodes.

11. The system of claim 1, wherein the linear programmable network layer includes one or more components having linear impedances.

12. The system of claim 1, wherein the nonlinear activation layer includes one or more diodes used for creating a sigmoid nonlinearity as activation function.

13. A system, comprising:

a plurality of linear programmable network layers, each of the plurality of linear programmable network layers including a plurality of inputs, a plurality of outputs, and a plurality of linear programmable network components interconnected between the plurality of inputs and the plurality of outputs; and at least one nonlinear activation layer interposed between the plurality of linear programmable network layers, each of the at least one nonlinear activation layer coupled with the plurality of outputs of a linear programmable network layer of the plurality of linear programmable network layers and coupled with the plurality of inputs of a next linear programmable network layer of the plurality of network layers, each of the at least one nonlinear activation layer including a nonlinear activation module and a regeneration module configured to scale a plurality of output signals from the plurality of outputs, the plurality of linear programmable network layers and the at least one nonlinear activation layer being configured to minimize a content for the system, the content for the system corresponding to a pseudo-power for electrical characteristics of the system, wherein the regeneration module includes a bidirectional amplifier, wherein the regeneration module scales voltage in a forward direction towards output voltages or a next layer by a gain factor of G, wherein the regeneration module scales current in a reverse direction towards input voltages by a gain factor of 1/G, and wherein in the event that G is equal to 1, the regeneration module behaves as a short circuit and maintains a minimum of the content for the system such that in response to the input voltages, the output voltages have a stationary state at the minimum of the content for the linear programmable network layer and the nonlinear activation layer;

wherein a plurality of input signals is provided to the plurality of inputs of a first linear programmable network layer of the plurality of linear programmable network layers, the plurality of input signals resulting in a plurality of final output signals at the plurality of outputs of a final linear programmable network layer of the plurality of linear programmable network layers and corresponding to a stationary state of the system, and wherein the plurality of outputs of the final linear programmable network layer are configured to receive a plurality of perturbations that results in a plurality of perturbation output signals at the plurality of outputs of each remaining linear programmable network layer of the plurality of linear programmable network layers, the plurality of outputs of each remaining linear programmable network layer of the plurality of linear programmable network layers having a plurality of nodes for measuring the plurality of perturbation output signals, a gradient for each remaining linear programmable network layer of the plurality of linear programmable network components of the linear programmable network layer being based on the plurality of perturbation output signals and the plurality of final output signals, at least one of the plurality of linear programmable network components in the linear programmable network layer being configured to be reprogrammed based on the gradient.

14. The system of claim 13, wherein each of the plurality of linear programmable network layers includes a programmable resistive network layer.

15. The system of claim 14, wherein the programmable resistive network layer includes a fully connected programmable resistive network layer.

16. The system of claim 14, wherein the programmable resistive network layer includes a sparsely connected programmable resistive network layer.

17. The system of claim 14, wherein the programmable resistive network layer includes a plurality of memristive devices.

18. A method, comprising:

providing a plurality of input signals to a learning system including a plurality of linear programmable network layers and at least one nonlinear activation layer, each of the plurality of linear programmable network layers including a plurality of inputs, a plurality of outputs, and a plurality of linear programmable network components interconnected between the plurality of inputs and the plurality of outputs, the at least one nonlinear activation layer interposed between the plurality of linear programmable network layers, each of the at least one nonlinear activation layer coupled with the plurality of outputs of a linear programmable network layer of the plurality of linear programmable network layers and coupled with the plurality of inputs of a next linear programmable network layer of the plurality of network layers, the plurality of linear programmable network layers and the at least one nonlinear activation layer being configured to have a stationary state at a minimum of a content of the learning system, the plurality of input signals resulting in a plurality of output signals corresponding to the stationary state, the content for the learning system corresponding to a pseudo-power for electrical characteristics of the system, wherein the at least one nonlinear activation layer further includes a nonlinear activation module and a regeneration module, wherein the regeneration module is coupled with the plurality of outputs and with the nonlinear activation module, the regeneration module being configured to scale a plurality of output signals from the plurality of outputs, wherein the regeneration module includes a bidirectional amplifier, wherein the regeneration module scales voltage in a forward direction towards output voltages or a next layer by a gain factor of G, wherein the regeneration module scales current in a reverse direction towards input voltages by a gain factor of 1/G, and wherein in the event that G is equal to 1, the regeneration module behaves as a short circuit and maintains the minimum of the content of the learning system such that in response to the input voltages, the output voltages have the stationary state at the minimum of the content for the linear programmable network layer and the nonlinear activation layer;

perturbing the plurality of outputs for a first linear programmable network layer of the plurality of linear programmable network layers to provide a plurality of perturbation output signals at the plurality of inputs of a second linear programmable network layer of the plurality linear programmable network layers;

determining a gradient for the plurality of linear programmable network components of the second linear programmable network layer based on the plurality of perturbation output signals and the plurality of output signals, the determining the gradient including measuring the plurality of perturbation output signals; and reprogramming at least one of the plurality of linear programmable network components in the second linear programmable network layer based on the gradient.

19. The method of claim 18, wherein the perturbing further includes:

providing a plurality of perturbation input signals to the plurality of outputs of the first linear programmable network layer, the plurality of perturbation input signals corresponding to a second plurality of outputs closer to a plurality of target outputs than the plurality of output signals.

20. The method of claim 18, further comprising:

iteratively performing the providing the input signals, perturbing the plurality of outputs, determining the gradient and reprogramming.

* * * * *